(12) United States Patent
Kamat et al.

(10) Patent No.: US 8,600,880 B2
(45) Date of Patent: Dec. 3, 2013

(54) METHOD AND SYSTEM FOR PROVIDING POINT OF SALE SERVICES

(75) Inventors: Shreyas J. Kamat, Orem, UT (US); G. Mack Lowe, Riverton, UT (US); Robert E. Morgan, Glendale, AZ (US); Larry V. Ross, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1628 days.

(21) Appl. No.: 10/708,594

(22) Filed: Mar. 12, 2004

(65) Prior Publication Data
US 2005/0203753 A1    Sep. 15, 2005

(51) Int. Cl.
G06Q 40/00    (2012.01)

(52) U.S. Cl.
USPC .......................................................... 705/39

(58) Field of Classification Search
USPC ........ 705/39–41; 235/379–381; 709/203, 224
See application file for complete search history.

(56) References Cited

U.S. PATENT DOCUMENTS

| | | | |
|---|---|---|---|
| 5,490,251 A | 2/1996 | Clark et al. | |
| 5,510,979 A | 4/1996 | Moderi et al. | |
| 5,798,508 A * | 8/1998 | Walker et al. | 235/380 |
| 5,899,980 A | 5/1999 | Wilf et al. | |
| 5,941,954 A * | 8/1999 | Kalajan | 709/239 |
| 5,949,044 A * | 9/1999 | Walker et al. | 235/379 |
| 5,999,938 A * | 12/1999 | Bliss et al. | 1/1 |
| 6,052,629 A | 4/2000 | Leatherman et al. | |
| 6,098,053 A | 8/2000 | Slater | |
| 6,163,772 A | 12/2000 | Kramer et al. | |
| 6,189,785 B1 | 2/2001 | Lowery | |
| 6,193,155 B1 * | 2/2001 | Walker et al. | 235/381 |
| 6,202,054 B1 | 3/2001 | Lawlor et al. | |
| 6,330,544 B1 * | 12/2001 | Walker et al. | 705/14 |
| 6,381,582 B1 | 4/2002 | Walker et al. | |
| 6,401,074 B1 | 6/2002 | Sleeper | |
| 6,415,261 B1 | 7/2002 | Cybul et al. | |
| 6,418,441 B1 | 7/2002 | Call | |
| 6,529,940 B1 | 3/2003 | Humble | |
| 6,633,877 B1 | 10/2003 | Saigh et al. | |
| 7,165,239 B2 * | 1/2007 | Hejlsberg et al. | 717/114 |
| 7,409,405 B1 * | 8/2008 | Masinter et al. | 1/1 |
| 7,660,902 B2 * | 2/2010 | Graham et al. | 709/229 |
| 2001/0037245 A1 | 11/2001 | Ranganath et al. | |
| 2002/0016721 A1 * | 2/2002 | Mason et al. | 705/3 |
| 2002/0130186 A1 | 9/2002 | Lasch et al. | |
| 2003/0004891 A1 | 1/2003 | VanRensburg et al. | |

(Continued)

OTHER PUBLICATIONS

PCT; International Search Report dated Jul. 2, 2009 in Application No. PCT/US2005/002798.

(Continued)

*Primary Examiner* — Olabode Akintola
(74) *Attorney, Agent, or Firm* — Snell & Wilmer L.L.P.

(57) ABSTRACT

A system for transmitting information between a seller and a supplier uses a web services application to interface between a seller application and the supplier's server. The web services application uses a proxy to transmit information from the web services application to the supplier's server in a secure and reliable manner. The information is transmitted via HTTP using SOAP messages that conform to WSDL. In such a manner, the web services application can transmit selected information to the supplier's server, without any need to re-key redundant information. The proxy provides various services, such as encryption/decryption, digital signing, non-repudiation services, reporting capabilities, and software updating capabilities.

17 Claims, 3 Drawing Sheets

(56) References Cited

U.S. PATENT DOCUMENTS

| | | |
|---|---|---|
| 2003/0014317 A1 | 1/2003 | Siegel et al. |
| 2003/0061093 A1* | 3/2003 | Todd ............................... 705/14 |
| 2003/0101257 A1 | 5/2003 | Godwin |
| 2003/0120546 A1 | 6/2003 | Cusack et al. |
| 2003/0120548 A1 | 6/2003 | Azhimov |
| 2003/0132291 A1 | 7/2003 | Schmidt et al. |
| 2003/0154139 A1 | 8/2003 | Woo |
| 2003/0158792 A1 | 8/2003 | Perkowski |
| 2003/0158811 A1 | 8/2003 | Sanders et al. |
| 2003/0195762 A1* | 10/2003 | Gleason et al. ................... 705/1 |
| 2003/0205620 A1 | 11/2003 | Byun et al. |
| 2004/0201009 A1 | 10/2004 | Hsu et al. |
| 2004/0251451 A1 | 12/2004 | Burgard et al. |
| 2004/0255287 A1* | 12/2004 | Zhang et al. .................. 717/171 |

OTHER PUBLICATIONS

PCT; International Preliminary Report on Patentability dated Nov. 17, 2010 in Application No. PCT/US2005/002798.

* cited by examiner

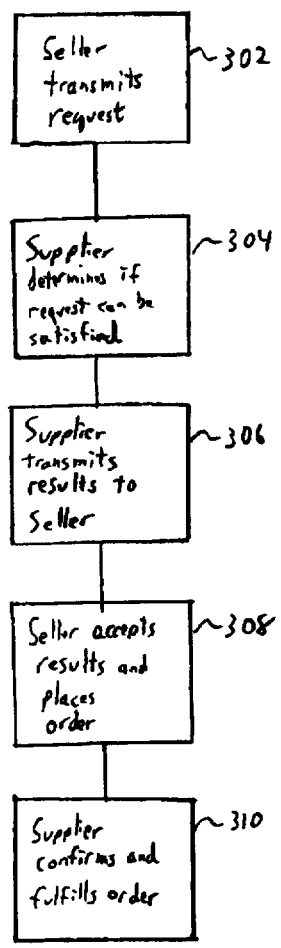

US 8,600,880 B2

METHOD AND SYSTEM FOR PROVIDING POINT OF SALE SERVICES

FIELD OF INVENTION

This application generally relates to point of sale services, and more particularly, to a method and system for transmitting messages from a seller to a supplier using a web services and proxy application.

BACKGROUND OF INVENTION

Sellers often sell products or services provided by others. In some circumstances, the product being sold is monitored by the third party supplier. For example, sellers sometimes issue travelers checks provided by an issuing financial institution. In order to implement the related functionality, in the past, the sellers maintained a dedicated, proprietary computer system that is coupled to the issuing financial institution system, so that the financial institution can track the various travelers checks via, for example, a seller identifier, an order number, a serial number, and the like.

Such a system had several disadvantages. For example, because of the costs involved in purchasing and maintaining a separate, proprietary system, many smaller merchants were not able to sell the products of the issuing financial institution. In addition, a separate system often resulted in increased information technology expenses because of the need to maintain separate systems and train the employees on different systems. Furthermore, sellers typically need to provide certain information to the issuing financial institution, and in some instances, sellers may be reluctant to provide confidential data to an issuing financial institution, in a situation where sellers are accessing the point of sale system via a web site. It is desirable to provide a new system for providing such goods to users that alleviates or minimizes the above-described problems.

SUMMARY OF INVENTION

A system of the present invention provides the desired functionality via an Internet interface. In one embodiment, a web browser is used to send and receive transaction details between the seller and the supplier. In addition, a web services interface may also be used to send and receive transaction details between the seller and the supplier. The use of a web service interface allows a seller to use a pre-existing application to interface with the supplier. The supplier application may facilitate exchanging information with the seller application and the supplier application. The system may facilitate the sale of traveler's checks or other prepaid products and services.

The system may also use a proxy application coupled between the seller application and the supplier application, wherein the proxy application is configured to translate data from a format used by the seller application to a format used by the supplier application. The proxy application may facilitate transmitting data using SOAP, HTTP or XML (e.g., WSDL) between the seller application and the supplier application. The proxy application may also provide encryption/decryption services, the ability to digitally sign messages, non-repudiation services, reporting capabilities, and software updating capabilities.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

FIG. 3 is a flow chart illustrating an exemplary process by which an embodiment of the present invention operates.

DETAILED DESCRIPTION

Figure 1:
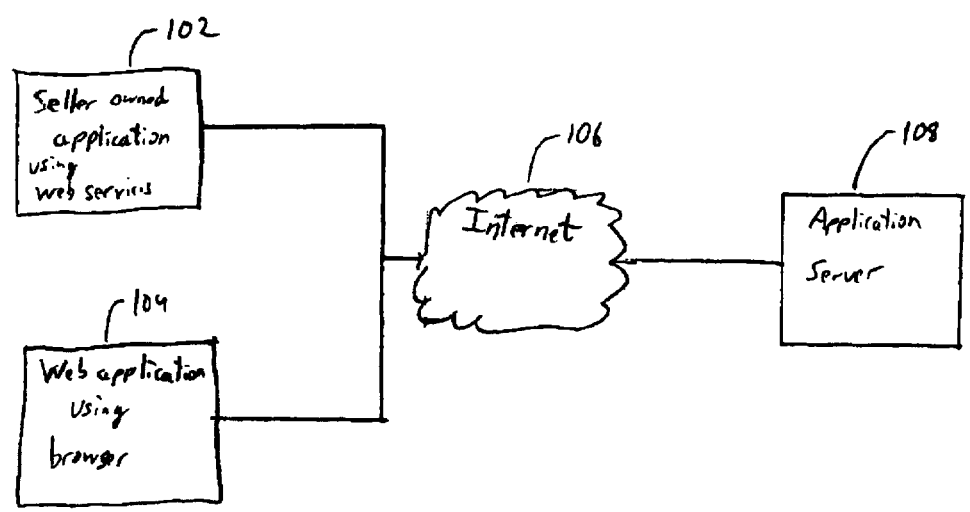
FIG. 1 presents a block diagram overview of an embodiment of the present invention.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system of the present invention.

A system of the present invention may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor, and a plurality of databases, said databases including client data, seller data, supplier data and/or like data that could be used in association with the present invention. As those skilled in the art will appreciate, a user's computer will typically include an operating system (e.g., Windows NT, 95/98/2000, Linux, Solaris, etc.) as well as various conventional support software and drivers typically associated with computers. A user's computer may be in a home or business environment with access to a network. In one exemplary embodiment, access is through the Internet through a commercially-available web-browser software package. In another exemplary embodiment, access to the system is through a seller-owned application.

The applications discussed herein may be associated with databases. The term "database" may refer to any type of data organizing mechanism, such as relational databases, hierarchical databases, object-oriented databases, spreadsheets, and/or the like. Common database products that may be used to implement the databases include DB2 by IBM (Armonk, N.Y.), any of the database products available from Oracle Corporation (Redwood Shores, Calif.), Microsoft Access, Microsoft Excel, or SQL Server by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example. It should also be understood that a system of the present invention is not limited to a physical implementation of a single repository of information. It is also possible to have multiple repositories of information. The multiple repositories may be linked together in a variety of different manners to create a single logical repository of information.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computer may provide a suitable website or other Internet-based graphical user interface which is accessible by users. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

A block diagram illustrating an embodiment of the present invention is illustrated in FIG. 1. An exemplary embodiment of the present invention features a seller application containing web services capability (102). Web services capability is a software business function exposed by a company, usually through the Internet, so that another company or software system can use the system. Web services may include applications which are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise" (2003), hereby incorporated herein by reference.

An embodiment may also contain a web application 104 that is accessible by an internet browser. Web application 104 may take a variety of different formats, such as using forms and search functions that allow the transmission of information and the display of the information in a predetermined format. Both seller application 102 and web application 104 are coupled, via the Internet (106) to an application server (108), which is configured to facilitate the processing of various requests for a supplier. Either seller application 102 and web application 104 can be used to connect to application server 108 to conduct a transaction.

When web application 104 is used to connect to application server 108, various information is transmitted to and stored on application server 108 for processing. However, when seller application 102 is used to connect to application server 108, seller application 102 may be configured to store certain information within seller application 102, only transmitting selected information to application server 108. In this manner, seller application 102 can prevent or minimize confidential information from being transmitted to application server 108. This aspect will be discussed in further detail below.

The transmission of information via seller application 102 to application server 108 may occur in a variety of different methods. In one embodiment, Web Services Description Language ("WSDL"), an XML format for describing network services as a set of endpoints operating on messages containing either document-oriented or procedure-oriented information. Information may also be transmitted using Simple Object Access Protocol ("SOAP") messages, a protocol for exchange of information in a decentralized, distributed environment.

Such a feature may be desirable for various different reasons. For example, seller may be a financial institution and the product being sold may be travelers checks. Seller may not want to transmit confidential client information to application server 108, to preserve the confidentiality of its clients. Use of web application 104 would result in the transmission of potentially confidential information to application server 108. By using seller application 102, the type and amount of information being transmitted to application server 108 can be tightly controlled by transmitting only certain information to application server 108. Since the seller has full control over the application that resides at the seller's location, seller can include only the data that is required to complete the point of sale web service transaction. The seller need not send the personal data of the customer. For example, for completing a traveler check point of sale transaction, there is no need to include the customer's bank account number and contact information.

In addition, by allowing the seller to use its own systems, the need to re-enter information regarding a prospective purchaser would also save a large amount of time for the seller. For example, if the seller is a financial institution, it may already have information regarding the purchaser, such as his name and address. There would be no need to re-enter that information because an embodiment of the present invention is able to integrate with the seller's existing systems, which already have such information readily available.

In addition to travelers checks, a variety of different financial products may also be sold using a method and system of the present invention. For example, gift checks, gift cards, and other prepaid services, and foreign currency notes can be sold using a method and system of the present invention. In addition, non-financial products may also be sold using a method and system of the present invention.

The use of web services to provide such functionality allows a seller to almost seamlessly integrate its existing back office, intranet, or any other application with application server 108. Such an approach does not require a dedicated communication link between the seller and the supplier's application server 108. The result is a cost savings for sellers.

Figure 2:
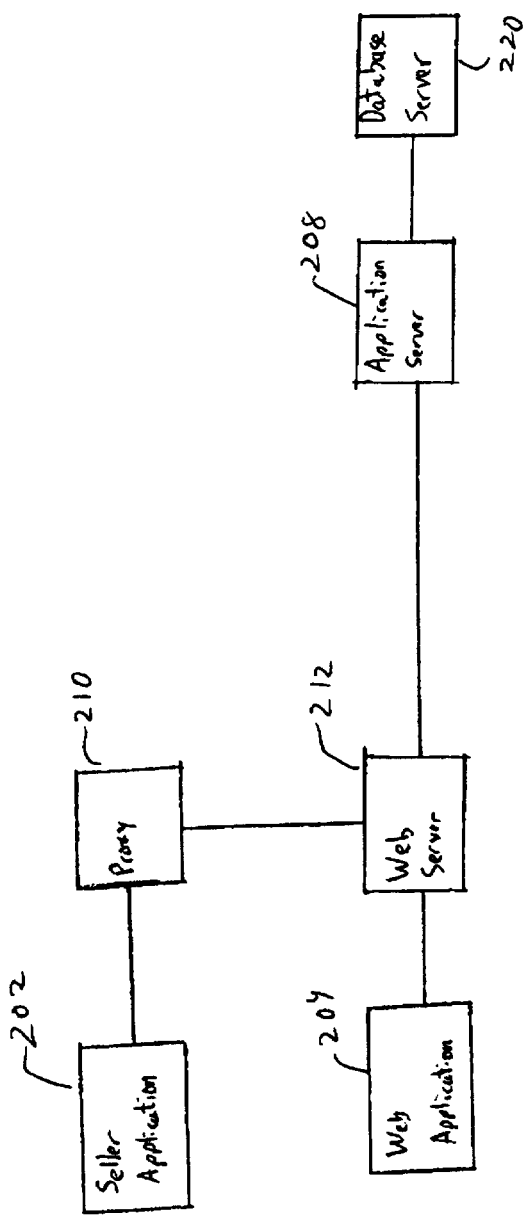
FIG. 2 is a more detailed block diagram overview of an embodiment of the present invention.

A block diagram overview of another embodiment of a system of the current invention is shown in FIG. 2. A web application 204 is coupled to a web server 212, which is in turn coupled to an application server 208, which accesses information from a database server 220. A seller application 202 is also coupled to the system, using a proxy 210. Proxy 210 is used to transmit the data transmitted between seller application 202 and web server 212. Web server 212 may be used in a variety of different methods to perform the desired tasks.

Proxy 210 performs several different functions. For example, proxy 210 may be configured to perform the low-level details of encryption/decryption and digital signing of messages. Encryption/decryption is used to ensure the confidentiality of data. Encryption is the translation of data into a secret code. In order to read data that was encrypted, the data must be first decrypted. Various forms of encryption may be used, such as public-key encryption and symmetric encryption. Digital signing of data involves the addition of a unique identifier to data to confirm that the identity of the party sending the data. The use of encryption and digital signing can dramatically reduce the likelihood of fraud and security attacks.

Proxy 210 may also provide non-repudiation services. This feature ensures that a receiver of a transmitted message cannot dispute having sent the message. This feature reduces fraud and helps to diagnose problems if one party claims to have not transmitted or received a particular message.

In addition, a proxy can ensure that a message is received only once. If there is a problem in the transmission of a message, such a problem can be noted and the message can be delivered at a later time.

Proxy 210 may also be configured to provide reporting capabilities. Reporting capabilities include the ability to aggregate transactions to summarize the transactions performed by a seller during a specified time period. The summary of transactions may be presented in a variety of different ways in order to allow sellers to view data in a format it considers to be helpful. The reporting may be configured such that the reports may be viewable using a standard web browser, obviating the need to build reporting capabilities at either end. Such a reporting feature may also be used by the supplier to enhance troubleshooting of its communications, if it uses multiple sellers.

Proxy 210 may also be configured to automatically update the software being used to communicate between seller application 202 and web server 212. The software may need to be updated due to patches, upgrades, security fixes, and the like. Proxy 210 can be configured to forward updates to seller application 202. By using proxy 210 to perform software updating functions, a system of the present invention will allow a supplier to seamlessly upgrade its connections to multiple sellers, without having to manually update each individual seller connected to web server 212.

Using a proxy to perform such functions allows the applications at web server 212 to be transparent to seller application 202, thereby lowering the costs of development and eliminating the invasive nature of business-to-business integration.

In one exemplary embodiment, Flamenco WSM, distributed by Flamenco Networks, is used as the proxy between seller application 202 and web server 212.

With respect to FIG. 3, an exemplary process by which the system of FIG. 2 operates to sell travelers checks is presented in flow-chart form. A seller enters product and quantity data and requests stock from the supplier's application server (step 302). The supplier's application server determines if the request can be satisfied (step 304) and transmits the results, including serial numbers of the travelers checks, to the seller's computer (step 306). The seller accepts the serial numbers, enters customer and payment data, and transmits the data to the vendor's application server (step 308). The supplier's application server confirms the order and stores information in its database (step 310).

The above-described method can be performed in a variety of different manners. For example, web application 204 may be used by the seller to perform the above described tasks. When web application 204 is used, seller keys information in various forms displayed on the web browser. The information is transmitted, using an encrypted protocol such as secure socket layer ("SSL") or secure hypertext transfer protocol ("S-HTTP"), between seller and supplier.

Seller application 202 may also be used by the seller to perform the above-described tasks. Seller application may be a pre-existing application that contains various information. For example, seller application may contain information about the end-purchaser of the goods, if the end-purchaser was a customer of the seller. Such information need not be re-entered by seller, as the information can be retrieved by the seller application, using a variety of methods known in the art, and transmitted to the supplier, via the proxy.

In the prior art, orders had to be entered using a dedicated terminal, using a dedicated connection between the seller and the supplier. Currently, the sellers either use an application based on client-server architecture which needs to be installed and maintained or use the web site access where the seller has no control over data and can not integrate the existing applications and processes. The present invention alleviates the need for installing and maintaining software at the seller location. This need may also be relieved by providing access to web-based software. However, the seller loses the control over the data and also loses the ability to integrate the existing applications residing at seller locations. The web services approach provided by the present invention overcomes the inadequacies of client-server software and web-based software.

An embodiment of the present invention allows step 302 to be performed either from within seller application 202 or using web application 204, alleviating the need for dedicated hardware and connections as well as alleviating the need to create custom software. It can thus be seen that the problems of the prior art can be reduced or eliminated by an embodiment of the present invention.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, Mac OS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, Dilip Naik, "Internet Standards and Protocols" (1998); "Java 2 Complete", various authors, (Sybex 1999); Deborah Ray and Eric Ray, "Mastering HTML 4.0" (1997). Loshin, "TCP/IP Clearly Explained" (1997). All of these texts are hereby incorporated by reference.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

The invention claimed is:

1. A system comprising:
   a processor; and
   a memory storing computer-executable applications that, in response to execution by the processor, cause the processor to implement a method for facilitating transmission of messages from a seller to a supplier, wherein the computer-executable applications include:
      a seller application operable to store end-purchaser information;
      the seller application configured to populate a message with a subset of the end-purchaser information to preserve end-purchaser confidentiality, wherein the message is sent to a supplier application;
      the seller application further operable to receive prepayment data associated with at least one of a prepaid service and a prepaid good;
      the supplier application;
      a web application coupled to the supplier application and operable to accept user input containing one or more portions of the message; and
      a proxy application coupled between the seller application and the supplier application, wherein the proxy application is configured to:
         translate the message from a format used by the seller application to a format used by the supplier application,
         ensure that a receiver or a sender of the message cannot dispute having received or sent the message;
         authenticate that the message was created by a known sender, and that the message was not altered in transit;
         encrypt, decrypt and transmit the message from the seller application to the supplier application,
         report, to at least one of the supplier application and the seller application, an aggregate of transactions performed by a seller during a specified time period, and
         update communication software to communicate between the seller application and the supplier application.

2. The system of claim 1, wherein the seller application is a web services application.

3. The system of claim 1, wherein the proxy application is configured to facilitate transmitting the message using simple object access protocol (SOAP) and hypertext transfer protocol (HTTP) between the seller application and the supplier application.

4. The system of claim 1, wherein the supplier application is configured to facilitate exchanging information with the seller application and the supplier application.

5. The system of claim 1, wherein the proxy application facilitates transmitting information using extensible markup language (XML).

6. The system of claim 5, wherein the proxy module facilitates transmitting information using a simple object access protocol (SOAP) message conforming to web services description language (WSDL).

7. The system of claim 1, wherein the system facilitates transmitting information related to the sale of travelers checks.

8. The system of claim 1, wherein the system authenticates the message by digitally signing messages.

9. A method for facilitating transmission of messages from a seller to a supplier, the method being performed by a computer that includes a processor and a memory storing computer-executable applications, wherein the method comprises:
   a seller application causing end-purchaser information to be stored in the memory;
   the seller application receiving prepayment data associated with at least one of a prepaid service and a prepaid good;
   the seller application causing a message to be populated with a subset of the end-purchaser information to preserve end-purchaser confidentiality, wherein the message is sent to a supplier application;
   a web application causing user input containing one or more portions of the message to be accepted into the memory;
   a proxy application causing the message to be translated by the processor from a format used by the seller application to a format used by the supplier application,
   the proxy application ensuring that a receiver or a sender of the message cannot dispute having received or sent the message;
   the proxy application causing the message from the seller application to be encrypted/decrypted by the processor and transmitted to the supplier application,
   the proxy application ensuring that the message was created by a known sender, and that the message was not altered in transit;
   the proxy application causing an aggregate of transactions performed by a seller during a specified time period to be reported to at least one of the supplier application and the seller application, and
   the proxy application causing communication software to be updated to communicate between the seller application and the supplier application.

10. The method of claim 9, wherein the seller application is a web services application.

11. The method of claim 9, further comprising the step of transmitting data using simple object access protocol (SOAP) and hypertext transfer protocol (HTTP) between the seller application and the supplier application.

12. The method of claim 9, further comprising the step of exchanging information between the seller application and the supplier application.

13. The method of claim 9, further comprising transmitting information using extensible markup language (XML).

14. The method of claim 13, further comprising transmitting information using a simple object access protocol (SOAP) message conforming to web services description language (WSDL).

15. The method of claim 9, further comprising the step of transmitting information related to the sale of travelers checks.

16. The method of claim 9, wherein the proxy application ensures that the message was created by a known sender, and that the message was not altered in transit by digitally signing messages.

17. A computer-readable medium having stored thereon non-transitory sequences of instruction, the sequences of instruction which when executed by a computer based system for facilitating transmission of messages from a seller to a supplier, performs operations comprising:
   receiving, by a seller application, end-purchaser prepayment data associated with at least one of a prepaid service and a prepaid good;
   storing, by the seller application, end-purchaser information;
   populating, by the seller application, a message with a subset of the end-purchaser information to preserve end-purchaser confidentiality, wherein the message is sent to a supplier application;
   accepting, by a web application coupled to the supplier application, user input containing one or more portions of the message;
   translating, by a proxy application, the message from a format used by the seller application to a format used by the supplier application;
   ensuring, by the proxy application, that a receiver or a sender of the message cannot dispute having received or sent the message;
   authenticating, by the proxy application, that the message was created by a known sender, and that the message was not altered in transit;
   encrypting, decrypting and transmitting, by the proxy application, the message from the seller application to the supplier application;
   reporting, by the proxy application, to at least one of the supplier application and the seller application, an aggregate of transactions performed by a seller during a specified time period; and
   updating, by the proxy application, communication software to communicate between the seller application and the supplier application.

* * * * *